Feb. 4, 1958     F. W. HAMMESFAHR ET AL     2,822,327
METHOD OF GENERATING OZONE
Filed March 31, 1955
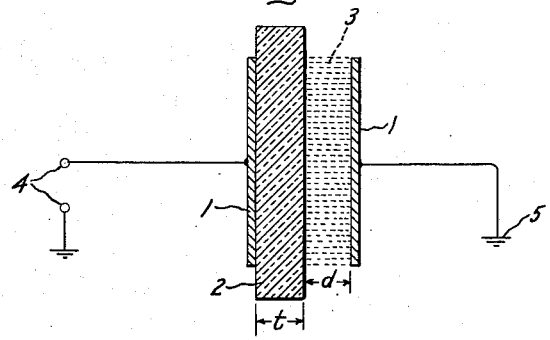
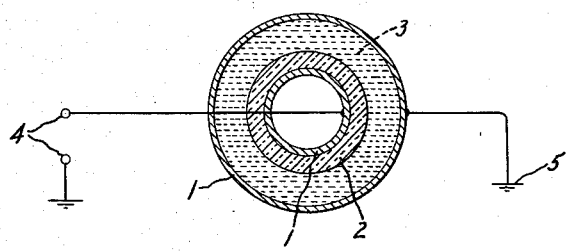
Inventors:
Frederic W. Hammesfahr,
Robert L. Hatch,
John J. Luckhowec,
by
Their Attorney.

2,822,327

METHOD OF GENERATING OZONE

Frederic W. Hammesfahr and Robert L. Hatch, Pittsfield, Mass., and John J. Luckhowec, Huntsville, Ala., assignors to General Electric Company, a corporation of New York Application March 31, 1955, Serial No. 498,332

4 Claims. (Cl. 204—176)

This invention relates to a new and improved method of generating ozone, and more particularly to a new method of increasing the output of silent electric discharge ozone generators.

The silent electric discharge ozone generators now available commercially yield undesirably low quantities of ozone per hour per sq. ft. of discharge area. While there have been some studies of operating variables directed toward increasing electrical efficiencies, measured in terms of minimum kwh. per pound of ozone, there have been no prior studies in so far as we are aware, directed to increasing ozone output per sq. ft. of discharge area. This is the primary object of this invention and improvement in electrical efficiency is specifically not an object of this invention.

More particularly, the outputs obtainable with available generators as now operated are low and range from approximately 3 to 6 grams of ozone per hour per sq. ft. of discharge area at effluent gas concentrations of 0.5 to 2 wgt. percent of ozone, thus necessitating very large equipment requirements for a given ozone output. For example, at these rates it would be necessary to have from about 6300 to about 12,600 sq. ft. of discharge area to produce a ton of ozone per day.

Accordingly, the principal object of this invention is to find a practical and economical method resulting in a very substantial increase in the yield of ozone per sq. ft. of discharge area. We now have found that this objective can be realized by operating in accordance with conditions hereinafter disclosed and described in greater detail and that ozone outputs of about 20 grams per hour per sq. ft. of discharge area or higher can be achieved. This substantial increase in output over that available with conventional methods and with available generators as now operated was actually obtained in accordance with the method of this invention with a power consumption of 4.3 kwh. per pound of ozone generated which is no higher than conventional values. In view of such high outputs, it is evident that equipment costs per ton of ozone per day can be greatly reduced because of the substantially decreased discharge area required.

In the accompanying drawing, forming a part of this specification and wherein similar reference characters designate corresponding parts throughout the several embodiments—

Fig. 1 is a cross sectional view of a conventional type of ozone generator which may be used in carrying out the method of the invention and Fig. 2 is an end view in section of another form of conventional ozone generator which may be employed in carrying out the method of the invention.

The generator shown in Fig. 1 comprises a pair of spaced, flat, parallel plate electrodes between which is a flat plate of dielectric material 2, for example, Pyrex glass. The electrodes are separated by a gap 3 filled with air or oxygen in which a discharge occurs when a proper voltage is applied across the electrodes from power supply 4. In practice, one electrode is connected to high voltage A.-C. power supply 4 and the other electrode to ground 5. When discharge occurs a portion of the air or oxygen in the discharge gap is converted to ozone. In operation, a steady stream of air or oxygen at a regulated pressure is passed through the discharge gap so as to carry out the ozone as rapidly as generated for use in any one of the many commercial applications now known for ozone.

An alternate apparatus (electrically equivalent to that shown in Fig. 1) which may be employed is illustrated in Fig. 2 which is an end view in section of a concentric tube ozone generator. In this embodiment, elements 1 are concentric tubular electrodes and tubular dielectric element 2 is concentric with and contiguous with the inner electrode. An annular discharge gap 3 of air or oxygen provides the area in which a discharge occurs when a proper A.-C. voltage is applied across the electrodes from power supply 4. The inner electrode is connected to power supply 4 and the outer electrode is connected to ground 5. In practice, operation of this generator is similar to that of the parallel plate generator shown in Fig. 1.

For optimum operation, a cooling medium may be applied to either or both electrodes in each of the embodiments shown in order to remove the heat liberated by the discharge.

Unexpectedly, we have discovered in accordance with this invention that ozone outputs ranging from about 8 to about 22 grams of ozone per hour per sq. ft. of discharge area can be achieved by utilizing a unique method in which there is maintained a prescribed interrelationship of the specific variables, voltage, frequency, dielectric thickness, dielectric constant of the dielectric material and discharge gap thickness. Specifically, the relationship among these variables must be such that the product of frequency, dielectric constant, and voltage squared divided by the sum of dielectric thickness and the quantity thickness squared divided by the product of dielectric constant and discharge gap thickness, is within a certain specific range. This relationship may be illustrated mathematically by the following expression:

$$\frac{fKE^2}{t+\frac{t^2}{Kd}}$$

where:

$f$ = frequency in cycles per second
$K$ = dielectric constant of the dielectric material
$E$ = applied voltage in volts (rms)
$t$ = thickness of the dielectric material in millimeters
$d$ = thickness of the discharge gap in millimeters We have discovered that in order to achieve ozone outputs in a range of 8 to 22 grams per hour per sq. ft. of discharge area, it is necessary that the value of the above expression, employing the indicated units of measurement, is in the range of $3.0 \times 10^{10}$ to $7.2 \times 10^{10}$. It is obviously possible to achieve the same over-all value for the expression by using a large number of different combinations of individual values for each of the variables. However, we have discovered that regardless of the values given to any one of the variables within very broad limits, an ozone output in the indicated range of 8 to 22 grams per hour per sq. ft. of discharge area can be realized provided that values for the remaining variables are selected to give an over-all value for the expression in the range $3.0 \times 10^{10}$ to $7.2 \times 10^{10}$.

To illustrate specifically, if it is desired to operate at 20,000 volts and at a frequency of 60 cycles using an air gap of 3.5 millimeters thickness with a dielectric material having a dielectric constant of 4.8, the required thickness of the dielectric material can be calculated from the above expression to be in the range of 3.22 millimeters to 1.47 millimeters to give an over-all value for the expression of $3.0 \times 10^{10}$ to $7.2 \times 10^{10}$, and ozone outputs in the range of 8 to 22 grams per hour per sq. ft. of discharge area. Similarly, it would be possible to define the range of voltage required in a given case if frequency, dielectric constant, dielectric thickness, and the discharge gap are fixed by other considerations.

In order to obtain the ozone outputs indicated above, it is necessary that certain concurrent conditions exist. One vital condition for obtaining the desired ozone output is the necessity that the density of the gas subjected to the silent electric discharge be within a certain range of values depending upon the values given for the variables discussed above. We have discovered that this optimum range can be determined by evaluating the expression $$\frac{E}{d+\frac{t}{K}}$$

wherein each of the symbols has the same meanings and units as indicated above. The optimum gas density range, expressed as density relative to its density at 60° F. and 1 atmosphere absolute pressure has been determined experimentally as follows:

| $\frac{E}{d+\frac{t}{K}}$ | Optimum Gas Density Range |
|---|---|
| 2,000 | 1.20–1.80 |
| 3,000 | 1.55–2.15 |
| 4,000 | 1.75–2.32 |
| 5,000 | 1.90–2.50 |
| 6,000 | 2.00–2.60 |
| 7,000 | 2.10–2.70 |
| 8,000 | 2.70–2.80 |

While gas density may range from 0.5 to 5, the optimum range is that shown above. Any substantial deviation from these density ranges causes an appreciable drop in ozone output.

Certain other considerations enter into the overall conditions required to obtain the desired ozone outputs. For example, the gas in the discharge gap should be of a high purity. When oxygen is employed, it should be 99 percent or higher purity, be hydrogen-free and have a dew point of about −60° F. or lower. This oxygen should be swept through the discharge gap with sufficient rapidity that the concentration of ozone in the effluent gas be in the range of 0.5 to 1 percent, by weight of the oxygen. A further consideration is the requirement that one or both of the electrodes be cooled sufficiently so that the temperature in the discharge gap does not rise above 100° F. These conditions may be varied somewhat. Oxygen of slightly lower purity can be employed; higher concentrations of ozone in the effluent up to 3 percent or higher and higher discharge temperatures up to 150° F. can be utilized. However, such variations are at the expense of some sacrifice of ozone output per sq. ft. of discharge area.

It is possible for frequency, dielectric constant, voltage, thickness of dielectric and air gap thickness to have considerably different values from one situation to another provided the relationship among these factors is maintained such that the value of the expression $$\frac{fKE^2}{t+\frac{t^2}{kd}}$$

as above is within the prescribed limits. For example, the dielectric constant of the dielectric material selected may range from about 2 to about 7, the voltage (rms voltage) may range from 5,000 to 50,000 volts, the thickness of the dielectric may range from about 1 to about 6 mm. and the air gap thickness may range from about 1 to about 8 mm. In certain circumstances values outside of these ranges may be employed satisfactorily so long as the value for the over-all expression is within the specified limits.

In order that those skilled in the art may more readily appreciate the method of this invention, the following examples are given by way of illustration and not by way of limitation.

*Example 1*

A concentric tube type generator of the type illustrated in Fig. 2 was employed. In this generator the outer electrode was composed of 61ST aluminum and had an inner diameter of 3.610 inches. The dielectric was Pyrex glass having an inner diameter of 2.898 inches and a wall thickness of 5.08 millimeters. The inside surface of the dielectric was painted with a conductive coating, specifically Hanovia Flexible Silver Coating Number 16, the coating serving as the inner electrode. The air gap between the Pyrex dielectric and the outer electrode was 3.99 mm. The outer surface of the outer electrode was cooled with liquid refrigerant at a temperature of −14° F. resulting in a gas temperature in the discharge gap of about 83° F. The values of the critical variables employed were as follows:

$f=60$ cycles
$K=4.8$
$E=38,000$ volts
$t=5.08$ millimeters
$d=3.99$ millimeters Substitution of these values in the expression $$\frac{fKE^2}{t+\frac{t^2}{Kd}}$$

gave a resultant value of $6.5 \times 10^{10}$. Substitution of these same values into the expression for determining optimum density, $$\frac{E}{d+\frac{t}{K}}$$

gave a value of 7500 indicating an optimum density range of 2.15 to 2.75. In the experiment a density of 2.55 was actually employed.

Oxygen of 99.5 percent purity and a dew point of −33° F. was passed through the discharge gap at such a rate that the concentration of ozone in the effluent gas was 0.76 percent by weight of the discharge gas. The ozone output was determined by standard KI-starch analysis to be 20.55 grams per hour per sq. ft. of discharge area. The power consumption was 4.31 kwh./lb. of ozone which is in the range of conventional practice.

*Example 2*

In this example a generator similar to that of Example 1 was employed. The outer electrode was of the same diameter; however, the inner electrode had a diameter of 2.982 inches. Other factors were the same in so far as the dielectric material and the coating materials employed in Example 1 were concerned. The values of the critical values were as follows:

$f=60$ cycles
$K=4.8$
$E=21,000$ volts
$t=2.70$ millimeters
$d=5.41$ millimeters Substitution of these values in the expression $$\frac{fKE^2}{t+\frac{t^2}{Kd}}$$

gave a value of $4.25 \times 10^{10}$. Substitution of the same values into the expression $$\frac{E}{d + \frac{t}{K}}$$

to determine optimum gas density, gave a value of 3500 indicating an optimum gas density in the range of 1.65 to 2.25. The actual gas density was 1.69. Ozone in a concentration of 0.82 wt. percent in the effluent gas, was obtained in a yield corresponding to 14.60 grams per hour per sq. ft. of discharge area. The electrical power requirement was 3.75 kwh./lb. of ozone.

Example 3

A generator in which the diameter of the outer electrode was the same as in Examples 1 and 2 was employed. The diameter of the inner electrode was 2.943 inches. The values of the critical values were as follows:

$f=60$ cycles
$K=4.8$
$E=24{,}000$ volts
$t=3.48$ millimeters
$d=5.00$ millimeters Substitution of these values in the expression $$\frac{fKE^2}{t + \frac{t^2}{Kd}}$$

gave a value of $4.16 \times 10^{10}$. Substitution of the same values into the expression $$\frac{E}{d + \frac{t}{K}}$$

to determine optimum gas density, gave a value of 4200 indicating an optimum gas density in the range of 1.78 to 2.35. The actual gas density was 2.10. Ozone, in a concentration of 0.90 wt. percent in the effluent gas was obtained in a yield corresponding to 16.15 grams per hour per sq. ft. of discharge area. The electrical power requirement was 3.56 kwh./lb. of ozone.

Ozone outputs obtainable in accordance with the method of this invention were compared with that obtainable from a well-known commercial generator operated in conventional manner. In the operation of the commercial generator, substitution of the variables employed in the expression $$\frac{fKE^2}{t + \frac{t^2}{Kd}}$$

gives a value of $2.2 \times 10^{10}$, which is outside the range of this invention. At this value, outputs of from 3 to 6 grams of ozone per hour per sq. ft. of discharge area are obtained. The magnitude of improvement in output for the method of the invention is up to 3 or more times higher.

|  | Conventional | Invention |
|---|---|---|
| Applied voltage _____ volts__ | 15,000 | 21,700 to 24,000 |
| Oxygen pressure _____ p. s. i. g__ | 8 | 20 to 24 |
| Ozone output, per sq. ft. of discharge _____ gm__ | 4.32 | 11.35 to 14.08 |

The present method of operation to increase equipment capacity may be employed to obtain greater output when the silent electric discharge units are used for reactions other than the generation of ozone, for example, in the manufacture of nitric oxide. This is possible because operation in accordance with the invention results in power inputs to the discharge of 135 to 200 watts per sq. ft. of discharge area as compared to power inputs of 50 to 100 watts per square foot of discharge area, obtainable with conventional silent electric discharge generators, as conventionally operated. The higher the power input to the discharge, the greater the chemical yield from the discharge, since it is the available power which induces the chemical reactions.

What we claim as new and desire to secure by Letters Patent of the United States is:

1. The method of increasing the ozone output of a silent electric discharge unit having spaced electrodes defining a discharge gap and a dielectric material between the electrodes, which comprises passing a gas selected from the group consisting of air and oxygen having a density of 0.5 to 5, between the electrodes of said unit while maintaining the relationship $$\frac{fKE^2}{t + \frac{t^2}{Kd}}$$

within the range $3 \times 10^{10}$ to about $7.2 \times 10^{10}$ wherein $f$ is the frequency in cycles per second, $K$ is the dielectric constant of the dielectric material, $E$ is the applied voltage in volts (rms), $t$ is the dielectric thickness in millimeters, and $d$ is the width of the discharge gap in millimeters and wherein $K$ is from about 2 to 7, $E$ is from about 5,000 to 50,000, $t$ is about 1 to 6 and $d$ is about 1 to 8.

2. The method of increasing the ozone output of a silent electric discharge unit having spaced electrodes defining a discharge gap and a dielectric material between the electrodes, which comprises passing a gas selected from the group consisting of air and oxygen having a density of 0.5 to 5, between the electrodes of said unit while maintaining the relationship $$\frac{fKE^2}{t + \frac{t^2}{Kd}}$$

within the range $3 \times 10^{10}$ to about $7.2 \times 10^{10}$, wherein $f$ is the frequency in cycles per second, $K$ is the dielectric constant of the dielectric material, $E$ is the applied voltage in volts (rms), $t$ is the dielectric thickness in millimeters, and $d$ is the width of the discharge gap in millimeters and wherein $K$ is from about 2 to 7, $E$ is from about 5,000 to 50,000, $t$ is about 1 to 6 and $d$ is about 1 to 8, the gas density being progressively increased from .5 to 5 as the value of the expression $$\frac{E}{d + \frac{t}{K}}$$

increases.

3. The method of claim 2 in which the gas is air.
4. The method of claim 2 in which the gas is oxygen.

References Cited in the file of this patent

UNITED STATES PATENTS 1,579,162    Starke et al. _____ Mar. 30, 1926